United States Patent
Abrahamsson et al.

(10) Patent No.: US 10,210,371 B2
(45) Date of Patent: Feb. 19, 2019

(54) METHOD FOR CALIBRATION OF A SENSOR UNIT AND ACCESSORY COMPRISING THE SAME

(71) Applicant: SONY MOBILE COMMUNICATIONS AB, Lund (SE)

(72) Inventors: Magnus Abrahamsson, Loddekopinge (SE); Gunnar Klinghult, Lund (SE); Andreas Kristensson, Sodra Sandby (SE); Martin Nystrom, Horja (SE)

(73) Assignee: SONY MOBOLE COMMUNICATIONS INC., Tokyo (JP)

(*) Notice: Subject to any disclaimer, the term of this patent is extended or adjusted under 35 U.S.C. 154(b) by 854 days.

(21) Appl. No.: 13/663,552

(22) Filed: Oct. 30, 2012

(65) Prior Publication Data

US 2013/0136301 A1 May 30, 2013

Related U.S. Application Data

(60) Provisional application No. 61/565,010, filed on Nov. 30, 2011.

(30) Foreign Application Priority Data

Jan. 4, 2012 (EP) .................................. 12150122

(51) Int. Cl.
*G06K 9/00* (2006.01)
*G06T 7/80* (2017.01)
(Continued)

(52) U.S. Cl.
CPC ............... *G06K 9/00* (2013.01); *G01C 17/38* (2013.01); *G01C 25/005* (2013.01); *G06K 9/00577* (2013.01); *G06T 7/80* (2017.01)

(58) Field of Classification Search
CPC .......... G01B 11/14; G06T 7/004; G06T 7/80; G06T 2207/30244; G06T 7/70;
(Continued)

(56) References Cited

U.S. PATENT DOCUMENTS 8,594,374 B1 * 11/2013 Bozarth .................. G06F 21/36
382/103
2007/0104353 A1 * 5/2007 Vogel ....................... G01C 1/04
382/106

(Continued)

FOREIGN PATENT DOCUMENTS

| JP | 2006242731 A | 9/2006 |
|---|---|---|
| WO | 2007125377 A1 | 11/2007 |
| WO | 2012082174 A1 | 6/2012 |

OTHER PUBLICATIONS

European Examination Report dated Feb. 25, 2015, corresponding to European patent application No. 12150122.5.

*Primary Examiner* — Kenny A Cese
(74) *Attorney, Agent, or Firm* — Renner Otto Boisselle And Sklar (57) ABSTRACT

Method, means, portable terminal accessory and system for calibrating a sensor device comprising a positioning unit detecting the position of the electronic device, an image capturing unit capturing an image of the environment around the electronic device, a processing unit detecting the presence of at least one identifiable object in the image captured and from a comparison of the position of the object in relation to the position of the user determining the heading of a user of the electronic device. Once the heading of the user is determined, it is used to calibrate one or more sensor devices or sensor functionalities in the electronic device.

13 Claims, 6 Drawing Sheets

(51) Int. Cl.
*G01C 17/38* (2006.01)
*G01C 25/00* (2006.01)

(58) Field of Classification Search
CPC .... H04N 7/181; H04N 13/0221; G01C 11/06; G01C 11/04; G01C 11/30; G01C 15/02; G01C 17/38; G01C 25/005; G06K 9/3241; G06K 9/00; G06K 9/00577; G06K 9/46
USPC .................................................. 382/103, 106
See application file for complete search history.

(56) References Cited

U.S. PATENT DOCUMENTS

| | | | |
|---|---|---|---|
| 2008/0255789 A1* | 10/2008 | Satoh | G01C 11/02 702/95 |
| 2009/0245573 A1* | 10/2009 | Saptharishi | G06K 9/00771 382/103 |
| 2009/0326816 A1 | 12/2009 | Park et al. | |
| 2010/0239121 A1* | 9/2010 | Meier | G06T 7/75 382/103 |
| 2010/0321489 A1* | 12/2010 | Chen | G01C 11/02 348/116 |
| 2011/0053642 A1* | 3/2011 | Lee | 455/556.1 |
| 2011/0178708 A1* | 7/2011 | Zhang | G01C 21/165 701/501 |
| 2011/0275408 A1 | 11/2011 | Kulik | |
| 2012/0206129 A1* | 8/2012 | Mahan | G01C 17/38 324/202 |

\* cited by examiner

METHOD FOR CALIBRATION OF A SENSOR UNIT AND ACCESSORY COMPRISING THE SAME

BACKGROUND

At present, the use of sensors in electronic devices and most notably on smartphones and digital tablets is becoming more and more common and one can safely state will soon become commonplace in any electronic device.

Usually, these sensors range from motion sensors, such as magnetometers, accelerometers (the compass function in an electronic device is a combination of magnetometer and accelerometer data) and gyros (providing info about rotation speed) to environmental and biosensors like air pressure sensors and also proximity sensors.

By utilising sensors in accessories for a portable terminal, such as for a mobile terminal, an application or cloud service could be provided with information about the user that is more cumbersome to achieve with other devices, since accessories can be designed to be attached to the user's body, e.g. headsets, bracelets, smart clothes etc. Especially, having motion and direction sensors in a headset would significantly improve many use cases by providing information on how the user is moving the head and what direction the user is facing. This information can not be provided by the portable terminal itself.

Sensors that are feasible in accessories are mainly of the MEMS (Microelectromechanical Systems) type.

However, in order to ensure safe correct functioning of these MEMS sensors several problems need to be overcome.

In the case of the compass, which is a combination of a magnetometer and an accelerometer, it gives an absolute heading (north) but is quite sensitive to magnetic disturbances. Calibration is done to compensate for local magnetic disturbances. The disturbances can be internally in the device (mobile terminal or accessory) or from iron in the surroundings (cars, the office chair . . . ). In a mobile terminal, the calibration of the compass is currently done by asking the user to move the phone in a known pattern, often like the digit eight, which is not practical when the compass is in e.g. a headset.

With regards to initialisation of Inertial Navigation Systems (INS) where one needs to be able to calculate the movement (distance) of the user utilizing the INS, the sensor data needs to be integrated twice, since the data is supplied by an accelerometer. In this context, noise and drift in the sensor signal will cause an integration error increasing with time. Therefore, the integration algorithms need to be occasionally reset when the electronic device or mobile terminal using the INS is in a known position.

Also, when evaluating data from a gyro one needs to compensate for drift in the rotation measurement data from the sensor. As is known in the art, a gyro usually gives an output in terms of degrees per second. Thus, to get the actual rotation (in degrees), the output from the gyro must be integrated with respect to time. Hence the algorithm must be occasionally reset in a known direction.

There is therefore a need for a more simple, efficient and cost-effective way of overcoming the initialization and calibration problems encountered with sensors which use known technology, especially in the context of accessories for mobile or portable terminals.

Moreover, it would be advantageous to provide a new and simpler way of recalibrating sensors and sensor functionality in mobile terminals which use data from two or more sensors, such as from the compass or the INS function in the mobile terminal.

SUMMARY

One solution to at least some of the problems associated with known technology is a method for calibrating a sensor unit or a sensor functionality in an electronic device according to the present invention, which includes the steps of detecting the position of the electronic device, capturing an image of the environment around the electronic device, detect the presence of at least one identifiable object in the image captured, determining the heading of a user of the electronic device by comparing the position of the object in relation to the position of the user and using the heading of the user in order to calibrate one or more sensor devices or sensor functionalities in the electronic device.

The advantage of this method is that it is a very simple and cheap way to detect the heading of the user using the electronic device which is applicable for sensor recalibration more than one sensor in the electronic device. Hence, the separate recalibration of each and every sensor in the electronic device is dispensed with.

According to one other aspect of the present invention, a solution to at least some of the problems mentioned in the background section of this application is means for calibrating a sensor device or a sensor functionality in a portable terminal which comprises a position detection device for determining the location of the portable terminal, an image capturing device for capturing and image of the environment around the portable terminal, a processing unit for analyzing the image captured so as to detect the presence of at least one identifiable object in the image, wherein the processing unit is adapted to determine the heading of the user by comparison of the position of the at least one identifiable object in relation to the position of the user and to use the heading in order to calibrate one or more sensor devices or sensor functionalities in the portable terminal.

According to another aspect of the present invention, the solution to at least some of the problems mentioned in the background section is a portable terminal accessory comprising functionality for calibrating a sensor device of a portable terminal, comprising a positioning unit for determining a geographical position of the portable terminal accessory, an image capturing device for capturing and image of the environment around the portable terminal, means for communicating data of the image captured to a portable terminal, means for receiving analyzed data from the image captured comprising data relating to known objects identified in the image captured and means for receiving data relating to a reference direction determined from a comparison of the geographical position of the accessory with the geographical coordinates of the known object recognized in the image captured.

According to yet another aspect of the present invention, one other solution to at least some problems of known technology mentioned in the background section earlier is a system for calibrating a sensor device which comprises a portable terminal, an accessory for the portable terminal, a positioning unit for determining a geographical position of the portable terminal and the accessory, an image capturing device for capturing an image of the environment around the accessory, a first receiver/transmitter unit for communicating data of the image captured to the portable terminal, a second receiver/transmitter unit for receiving data of the image captured in the portable terminal, a processing unit adapted to identify one or more known objects from the image data received wherein the processing unit is adapted to compare the geographical position of the accessory with the geographical coordinates of the known object identified from the image data in order to determine a heading of a user of the accessory or the portable terminal, the processing unit being further adapted to calibrate one or more sensors in the accessory or the mobile terminal by using the heading of the user determined.

DETAILED DESCRIPTION

Figure 1:
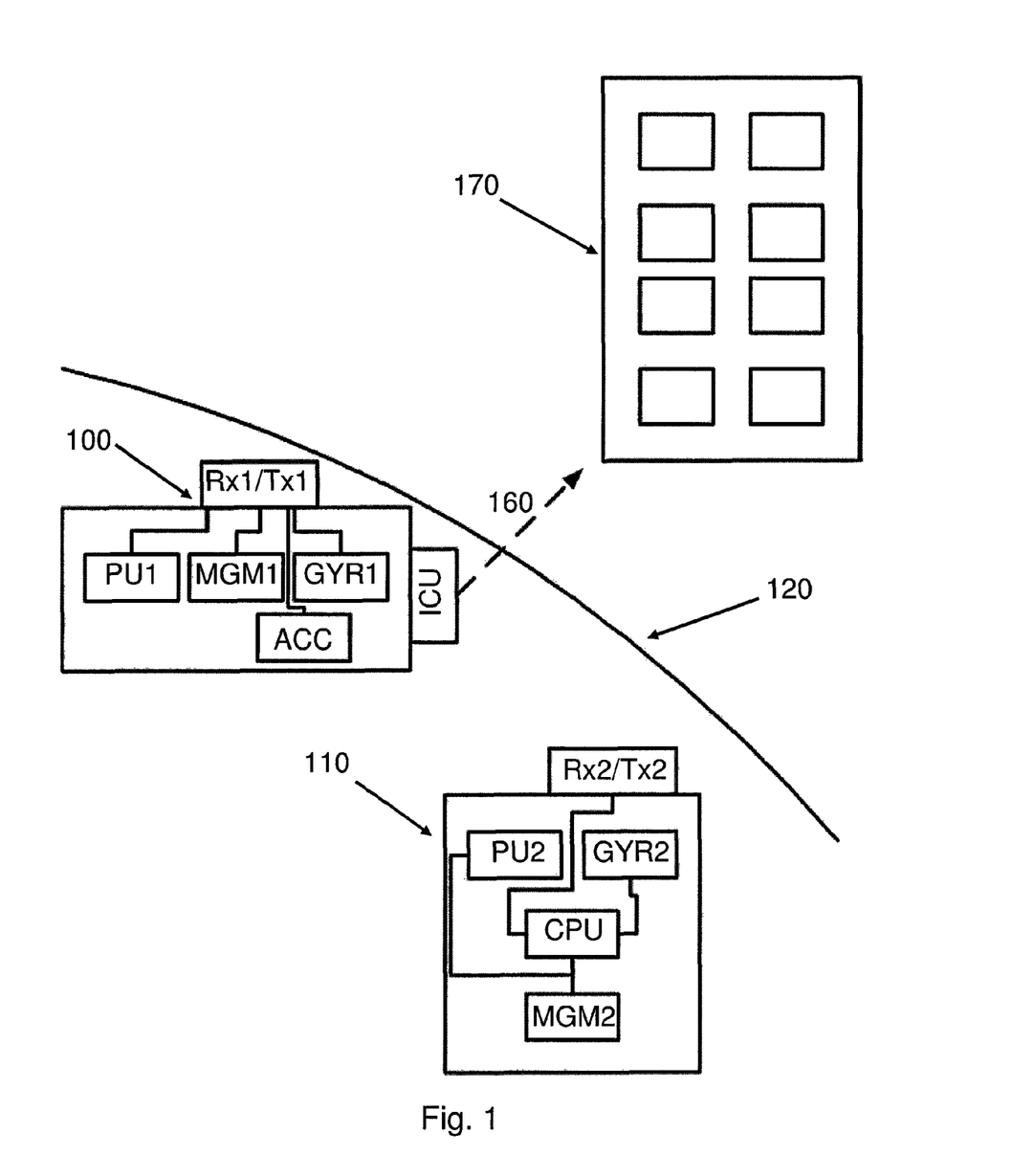
FIG. 1 depicts a first embodiment of the system, mobile terminal accessory and mobile terminal according to the present invention

FIG. 1 depicts a portable terminal accessory 100, such as a portable or mobile terminal accessory, a portable or mobile terminal 110 located in an area 120 and an object 170 located in the vicinity of the portable terminal accessory 100 and the portable terminal 110.

With regards to the portable terminal accessory 100, it comprises a first receiver/transmitter unit Rx1/Tx1, an image capturing unit ICU, a first gyro sensor GYR1, a first magnetometer MCM1, an accelerometer (ACC) and a first positioning unit PU1. As described earlier, the portable terminal accessory 100 could be for example a mobile terminal accessory that can be worn on the head of the user, on his clothes or some other part of his body. Using the first receiver/transmitter unit Rx1/Tx1, the electronic device can communicate with the portable terminal 110 via a radio communication network in order to exchange data or via a shortwave communication link, such as via Bluetooth, a wifi-link or some other means of wireless communication. It is also contemplated to have the portable terminal accessory 100 equipped with I/O-circuits (not shown) so that it can communicate with the portable terminal 110 via a wired link.

Most importantly, the portable terminal accessory 100 comprises an image capturing unit ICU which is able to capture images in its field of view. It can be any kind of kind of camera with sufficient resolution, so that different objects can be identified in the image captured. Objects to be identified can preferably be known landmarks, buildings or other well-known objects. Also, the first positioning unit PU1 of the portable terminal accessory 100 is adapted to register the geographical position 120 of the portable terminal accessory 100. One possibility is to have the positioning unit PU1 implemented as a GPS (Global Positioning System) receiver adapted to communicate with GPS satellites and from them extract the geographical coordinates of the portable terminal accessory 100.

Furthermore, the first magnetometer MGM1 is adapted to register the magnetic flux density around the portable terminal accessory 100 and to send this data to the portable terminal 110 via the first receiver transmitter Rx1/Tx1. Also, the accelerometer ACC is adapted to register rotational or translational acceleration of a user of the portable terminal accessory 100 in one or more directions. Finally, the first gyro sensor GYR1 is adapted to register rotational movement of the user carrying the portable terminal accessory 100 and to send this data via the first receiver/transmitter unit Rx1/Tx1 to the portable device 110.

Now, calibration of the first magnetometer MGM1 and gyroscope GYR1 sensors will be described. It is a well-known fact that these (and other) type of sensors can be disturbed either by magnetic disturbances in the environment surrounding them or by noise and drift in the signal measured by the sensor. However, the recalibration of these sensors has thus far been done by resetting the calculation algorithms to register a known position or direction.

Instead of doing this separately for each and every sensor in the electronic device, this embodiment of the present invention uses data from the first positioning unit PU1 located in the portable terminal accessory 100 or from the second positioning unit PU2 located in the portable terminal 110 in order to register the current position 120 of the portable terminal accessory 100.

According to one alternative, the first and second positioning units PU1 and PU2 may be GPS receivers. According to another alternative the first and/or second positioning units PU1 and PU2 may be signal strength measurement units adapted to measure the signal strength received from at least three base stations nearest to the portable terminal accessory 100 or the portable terminal 110. By transmitting these measured values to the processing unit CPU in the mobile terminal, the processing unit CPU may be adapted to calculate the approximate geographical location of the portable terminal accessory 100 or the portable terminal 110. Other ways of determining the position of the portable terminal accessory 100 and the portable terminal 110 are contemplated, such as implementing the two positioning units PU1 and PU2 as measurement units for received signal strength from WiFi-networks detected in the vicinity of the portable terminal accessory 100 and the portable terminal 110.

Additionally, the image capturing unit IMU is adapted to capture an image of the environment in its field of view (not shown). The image data captured by the image capturing unit IMU can be sent via the first receiver/transmitter Rx1/Tx1 of the electronic device 110 to the second receiver/transmitter unit Rx2/Tx2 of the portable terminal 110 which then forwards the data to the central processing unit CPU of the portable terminal 110. The processing unit CPU of the portable terminal 110 is adapted to compare the geographical or other location coordinates of the portable terminal accessory 100 and to apply image processing algorithms in order to identify a known object 170 in the image data captured by the image capturing unit ICU of the portable terminal accessory 100. From these two sets of data the processing unit CPU of the portable terminal 110 can than calculate the direction the image capturing unit ICU is facing. In this fashion, a reference direction 160 is calculated and the first magnetometer MGM1 and the first gyroscope GYR1 sensors can use the reference direction 160 to recalibrate the two sensors and to compensate for the drift or disturbances in the measured signal registered by them. This same reference direction 160 can also be used to recalibrate the second magnetometer MGM and gyroscope sensors GYR2 located in the mobile terminal 100.

Moreover, not only the sensors themselves, such as the gyro and magnetometer sensors GYR and MGM can be calibrated by the above described method and devices 100 and 110, but also other sensor functionality, such as the compass function, the inertial navigation system and other sensor functionalities which use a combination of data from two or more sensors.

As is mentioned earlier, the compass function, which may be located in the portable terminal 110, is a sensor functionality using data from an accelerometer and a magnetometer in order to determine the cardinal directions. In using the geographical position 120 of the user carrying the portable terminal accessory 100 and the portable terminal 110 and the reference direction or heading 160 determined, the as processing unit CPU can determine the cardinal directions for the compass functionality and also other intermediate directions on the compass. In this fashion, using the object coordinates from the object 170 identified in image data from the image capturing unit ICU and the geographical coordinates of the user, the compass functionality can be recalibrated.

Analogously, an inertial navigation system (INS) functionality, which uses data from an accelerometer and a gyroscope sensor, can be recalibrated using the method and means described earlier. More specifically, assuming that the user of the portable terminal accessory 100 and the portable terminal 110 is in a fixed geographical position 120 and that either the first or the second positioning unit PU1 or PU2 has determined the geographical coordinates of that position 120, the processing unit CPU in the portable terminal 110 can use these geographical coordinates and combine them with reference direction or heading of the user 160 determined earlier in order recalibrate the INS functionality from a known position and in a known direction.

This principle can be used for many other sensor functionalities either in the portable terminal accessory 100 or the portable terminal 110.

Data from the image capturing unit ICU can also be used in order to initialize the first and second magnetometers MCM1 and MGM2, gyroscope GYR1 and GYR2s above.

It should be added here that in order to recalibrate or reset the magnetometer MGM and the gyroscope GYR, it is preferred for the user to have a fixed position. In order to determine that the user is essentially standing still, i.e. neither walking nor rotating its body, image data captured by the image capturing unit ICU at at least two different points in time can be analyzed in the processing unit CPU of the portable terminal 110 using image processing algorithms. The reason for the preferred fixed position of the user when recalibrating sensors or sensor functionality is that an accelerometer measures rotation or translation speed, while the gyroscope sensor measures rotation in terms of angle/per second, which means that when the user has a fixed position, the output from the accelerometer ACC and the gyroscope GYR will be zero which is a good starting point for calibration.

However, it is also contemplated to use the above principle for sensor calibration for the case when the user is moving, such as when recalibrating the INS functionality. In that case, in order to calibrate the sensors in the portable terminal accessory 100 or the portable terminal 110 or both, the geographical position of the portable terminal accessory 100 or the portable terminal 110 must be taken into account.

Additionally, the image capturing device ICU can be either fixed so as to face the same direction in which the user is looking or to be able to move independently from the user. Additionally, the image capturing device can have a more or less limited field of view. The main point is that the field of view should be of sufficient size in order to be able to detect objects of interest.

It is understood that the portable terminal accessory 100 can comprise sensors other than the magnetometer MGM and gyroscope GYR sensor which need to be recalibrated from time to time.

Also, it is contemplated to dispense with the positioning unit PU1 in the portable terminal accessory 100 and to use the positioning unit PU2 of the portable terminal 110 for determining the geographical position of portable terminal accessory 100.

One other possibility is that the gyroscope sensor GYR can be dispensed with and replaced by the image capturing unit ICU which continuously captures images of the environment which are transmitted via the receiver/transmitter unit Rx1/Tx1 to the central processing unit of the portable terminal 110. From there the direction of movement of the user can be determined in the way described earlier. This embodiment is described more in detail in FIGS. 3 and 4A-4F.

Moreover, in cases where no landmarks or other known objects on the ground are observable, the user of the portable terminal accessory 100 may point the image capturing unit ICU at the sun. Once the image of the sun is captured by the image capturing unit ICU it can be sent via the first receiver/transmitter unit Rx1/Tx1 to the central processing unit CPU of the portable terminal 110 for evaluation. Together with the actual time which is readily available in the portable terminal 110 or from the positioning unit PU1 in the portable terminal accessory 100 the position of the sun can be calculated. Using this data and the data relating to the geographical position of the portable terminal accessory 100 available from the positioning unit PU1 or the positioning unit PU2 in the portable terminal 110, the processing unit CPU can determine the direction in which the user is pointing the portable terminal accessory 100. Using this direction, a new reference direction for the magnetometer MGM and the gyroscope GYR in the portable terminal accessory 100 can be utilized for calibrating or resetting these sensors. Also, sensor functionality mentioned earlier, such as the compass and inertial navigation system functionalities can be calibrated by means of the position of the sun.

In case no known object can be identified in the field of view of the image capturing unit ICU the image data captured by the image capturing unit ICU at two or more different time instants can be sent to the central processing unit CPU via the first receiver/transmitter unit Rx1/Tx1 where the central processing unit CPU can use image processing algorithms in order to detect movement or rotation of the user and compare them to sensor data received. In case of discrepancies when comparing these two sets of data by the processing unit CPU, the processing unit may recalibrate the sensors in the portable terminal accessory 100 or the portable terminal 110 by calculating relative movement or rotation of the user through comparison of the two or more image data sets captured at two or more time instants. In this fashion, sensor drift and local temporary disturbances in the sensor data received can be compensated. See the descriptions of FIGS. 4A-4F and the figures themselves for further information.

One other possible alternative in the case when no known object in the image data supplied by the image capturing unit ICU can be identified by the central processing unit CPU is let the user specify the geographical coordinates of his current position 120 via a user interface (not shown) of the portable terminal 110. This the user can either do by typing in the coordinates manually via for example a keypad or a user interface displaying a keypad or by selecting a position on a map comprising the geographical area where the user is located.

It should be mentioned that the portable terminal 110 besides the components mentioned above has all the standard functionality of a mobile terminal available today.

Additionally, it is contemplated to have all sensor functionality located in the portable terminal 110, while the portable terminal accessory 100 only comprises the first sending/receiving unit Rx1/Tx1 and the image capturing unit ICU. Such a portable terminal accessory 100 would be very simple and cheap to manufacture.

Now, the present invention will be described in terms of a method according to one embodiment of the present invention.

Figure 2:
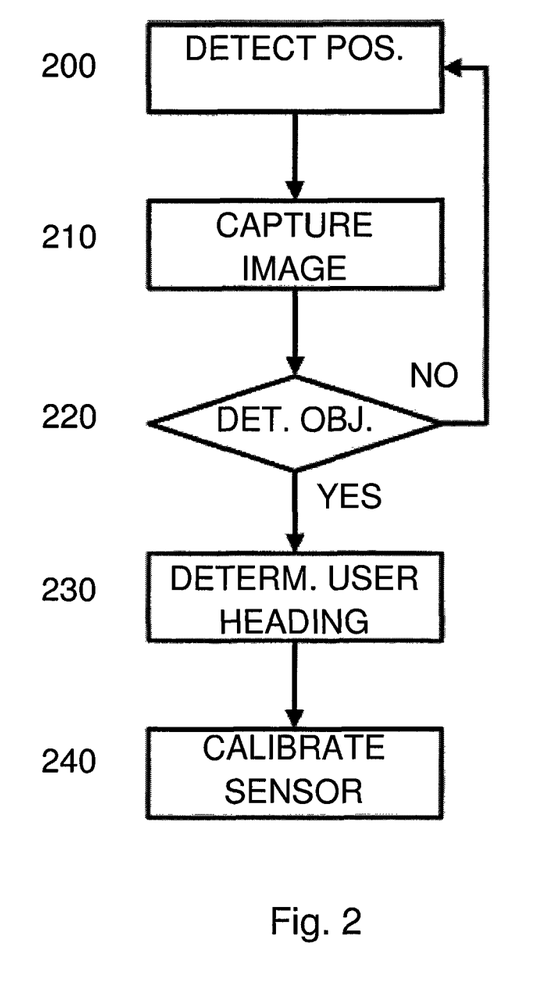
FIG. 2 depicts a flowchart of a method according to one embodiment of the present invention

FIG. 2 depicts flowchart implementing method steps according to one embodiment of the present invention. It should be mentioned here that these method steps are suitable to be implemented in a computer program which is stored on a chip or an internal or external memory of the portable terminal accessory 100.

At step 200 the geographical position 120 of the electronic unit, such as the portable terminal accessory 100 in FIG. 1 is determined. As described earlier, this can be done either by having a positioning unit PU1 built in to the portable terminal accessory 100 itself or by using the positioning unit PU2 in the portable terminal 110.

Thereafter, at step 210, an image capturing unit of the electronic device, such as the image capturing unit ICU in FIG. 1 captures an image of the environment in its field of view. The image data is then transmitted to a processing unit in the portable terminal where image processing algorithms are applied. If a known object is detected in the image data at step 220, such as a landmark, a known building or some other known object the direction which the image capturing unit is facing can be calculated by comparing the geographical coordinates of the electronic device with the geographical coordinates of the known object. Known objects can by way of example be identified by comparing the object extracted from the image data supplied by the image capturing unit with objects known from a geographical or satellite map available in an internal memory of the portable terminal. It is also contemplated to have the geographical or satellite map stored on server in a communication network which the portable terminal can access via a receiver/transmitter unit, such as the receiver/transmitter unit Rx2/Tx2 in FIG. 1.

If there is no known object identified in the captured image date the method returns to detect the geographical position of the electronic device again at step 200.

However, after the known object and its geographical coordinates are identified at step 220 the geographical coordinates of the user carrying the electronic device and the geographical coordinates of the object identified are used at step 230 to calculate the direction or heading the image capturing unit of the electronic device is facing.

Finally, at step 240 the one or more sensors in the electronic device are recalibrated with the direction determined at step 230 as a new reference direction. In this fashion a magnetometer which is built-in into the electronic device which has been affected by some magnetic disturbance in the environment around it can be recalibrated using the new reference direction from which the magnetic north and south poles can be determined. Also an accelerometer and a gyroscope sensor, such as the accelerometer ACC and gyroscope sensors GYR from FIG. 1 can be recalibrated with the help of the new reference direction from which integration of the movement of the user of the electronic device can start.

This is especially important since all three sensors and also other types of sensors are prone to problems with drift, disturbing magnetic fields in the environment and noise registered by the sensor.

Figure 3:
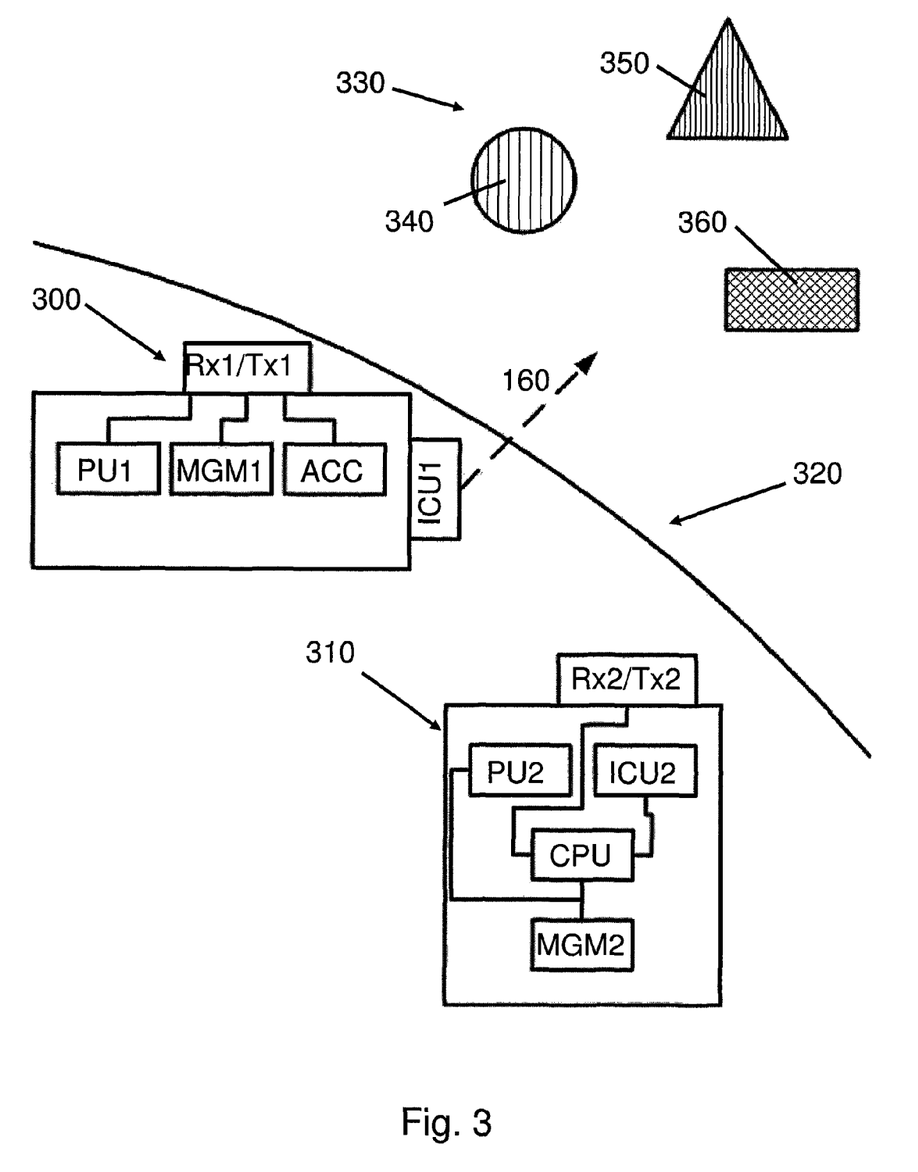
FIG. 3 depicts a second embodiment of the system, a portable terminal accessory and portable terminal according to the present invention.

Another embodiment of the present invention is presented in FIG. 3 where the first and a second image capturing unit ICU1 and ICU2 have replaced the first and second gyroscopes GYR1 and GYR2. The advantage of this second embodiment for the system, the mobile terminal accessory 100 and the portable terminal 110 is that they can be made at a lower cost, since one component (the gyroscope) is dispensed with.

Another difference in this embodiment is that in the field of view of the first image capturing unit ICU1 objects 340, 350 and 360 are present which cannot be identified as known objects (i.e. no landmarks and no sun are visible) as was the case in the embodiment in FIG. 1. Furthermore, in this embodiment, images and image calculations of the image capturing unit are used as a motion detector. In this case, the first and second gyroscopes GYR1 and GYR2 are dispensed with. It should be mentioned that, while the following description takes exclusive reference to the field of view of the first image capturing unit ICU1 in the mobile terminal accessory 300, it is equally valid for the field for the field of view of the second image capturing unit ICU2 located in the mobile terminal 310.

Objects 340, 350 and 360, while unknown, are still identifiable as such by the first image capturing unit ICU1. While in the embodiment in FIG. 3 these identifiable objects are simplified for clarity as geometrical shapes, such as a circle 340, a triangle 350 and a rectangle 360, they may or may not be of geometrical shape as long as they are identifiable as objects from one frame (image data captured by the image capturing unit during a certain time instant) to another. Hence, identifiable objects may also include colors, intensity spots and so on.

Similar to the embodiment of FIG. 1, the first image capturing unit ICU1 is adapted to capture image data in its field of view 330 and to transmit the image data via the first receiver/transmitter Rx1/Tx1 to the processing unit CPU of the mobile terminal 310 which receives the image data sent via the second receiver/transmitter Rx2/Tx2. However, in contrast to the first embodiment, the first image capturing unit ICU1 is adapted to capture image data in its field of view 330 at at least two different time instants.

Having received the at least two image data sets taken at two different time instants by the first image capturing unit ICU1, the processing unit is adapted to compare the two image data sets and detect differences. We assume for the sake of simplicity, that the identifiable objects in the two image data sets are the circle 340, the triangle 350 and the rectangle 360.

In order to detect movement of the mobile terminal accessory 300 and/or the mobile terminal 310, different movement scenarios for the identifiable objects 340-360 are explained using FIGS. 4A-4F.

However, before we proceed with explaining the different movement scenarios depicted in FIGS. 4A-4F it will be useful to define the plane in which a lens of the image capturing unit is located as identical with the paper plane of the drawing. Moreover, an axis around which the lens of the image capturing unit is centered is depicted by the crosshair in FIG. 4A.

In case the first image capturing unit ICU1 only comprises one image capturing device, one can obtain through imaging and image calculations applied to images from that capturing device a motion sensor system with six degrees of freedom, i.e. translation motion in three directions and rotational motion around three axes.

Figure 4A:
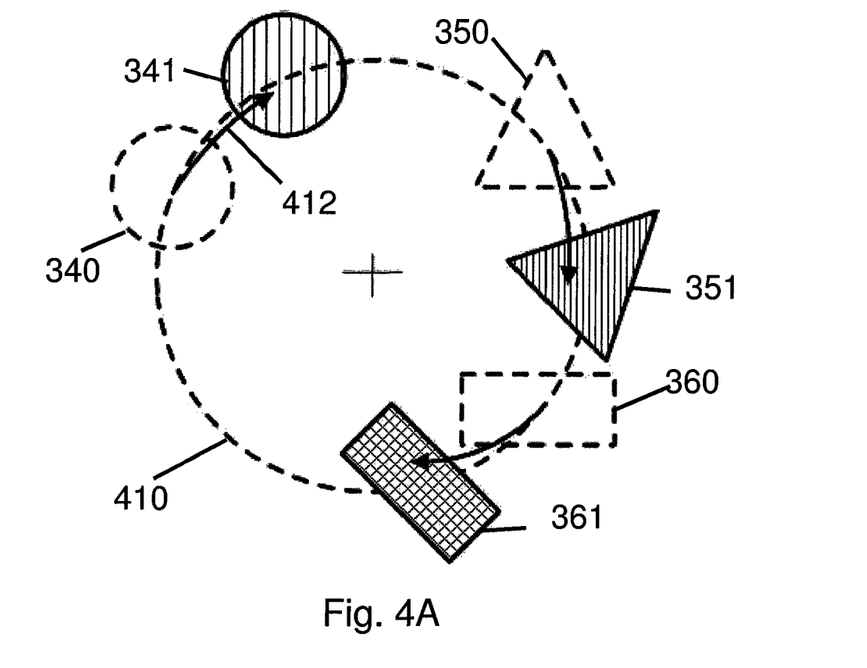
FIGS. 4A-4F depict different scenarios where objects registered by the portable terminal accessory or portable terminal according to the second embodiment of the present invention move in different ways.

In FIG. 4A a first rotational movement scenario is depicted, where the identifiable objects 340, 350 and 360 are detected by the processing unit CPU to have changed their position to 341, 351 and 361 by comparison of the image data sets taken at least at two different time instants by the first image capturing unit ICU1. Rotation around the axis around which the lens of the image capturing unit ICU1 is centered is detected by the processing unit CPU when all identified objects 340, 350 and 360 move and rotate with respect to a center point. In FIG. 4A, the rotation direction of the identifiable objects is indicated by arrows, such as the arrow 412. During rotational movement the angular displacement of all objects is equal.

Figure 4B:
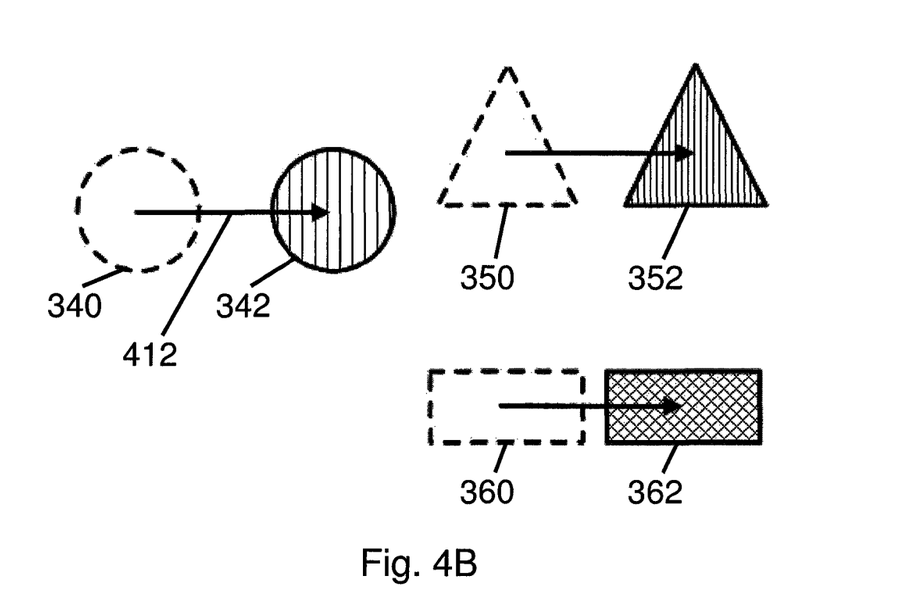

In FIG. 4B a second rotational movement scenario is depicted, where the identifiable objects 340, 350 and 360 are detected by the processing unit CPU to have changed their position to 342, 352 and 362. Rotation around a vertical axis is detected by the processing unit CPU by comparing two or more image data sets taken at different time instants when all identifiable objects 340, 350 and 360 move the same distance sideways. The angular displacement is calculated by the displacement indicated by the arrows, such as the arrow 420 and the properties of the lens of the image capturing unit ICU1.

Figure 4C:
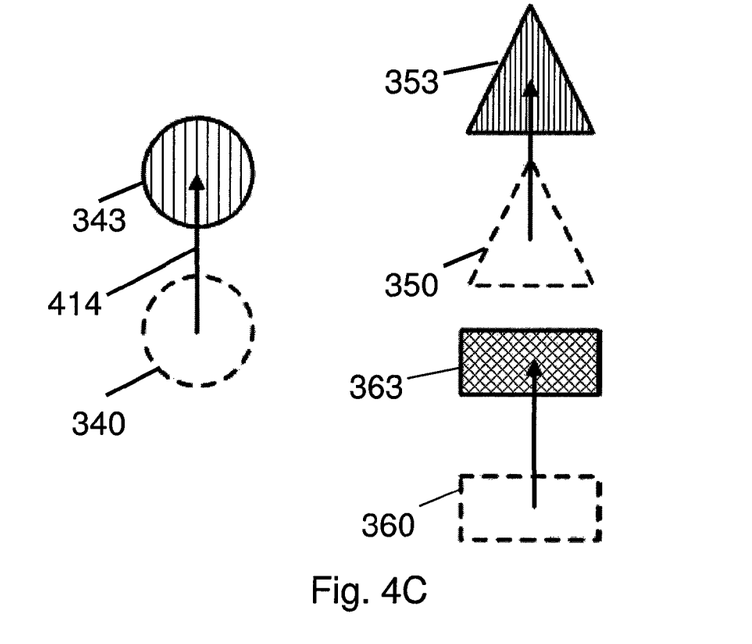
Figure 4D:
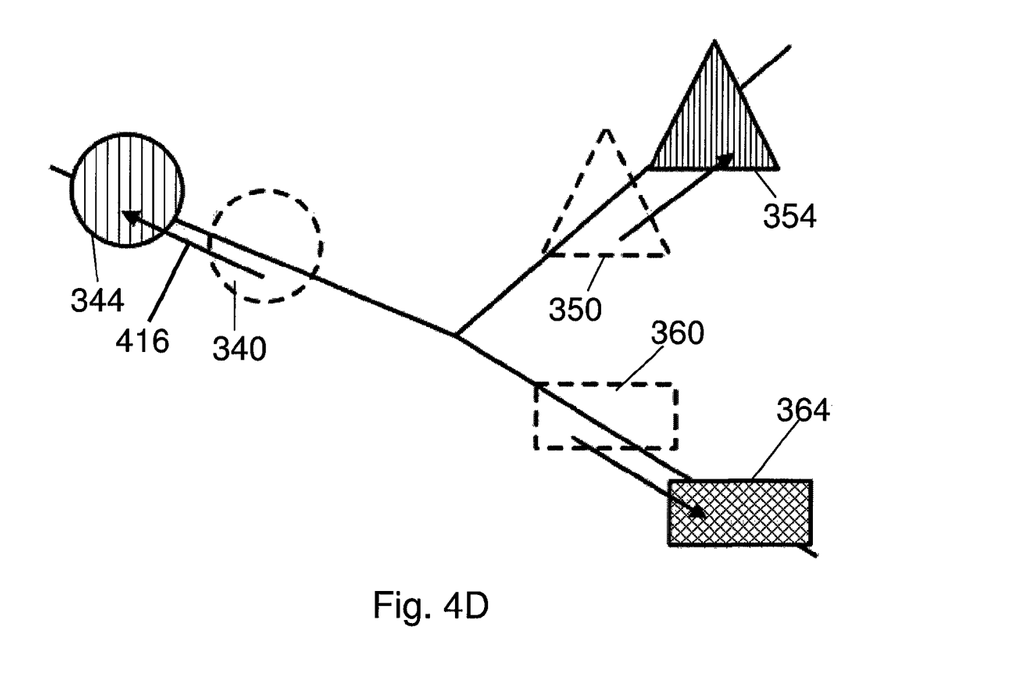

In FIG. 4C a third rotational movement scenario is depicted, where the identifiable objects 340, 350 and 360 are detected by the processing unit CPU to have changed their position to 343, 353 and 363. Rotation around a horizontal axis is detected by the processing unit CPU by comparing two or more image data sets taken at different time instants when all identifiable objects 340, 350 and 360 move the same distance laterally as indicated by the arrows in the figure, such as the arrow 414. In FIG. 4D a first translational movement scenario is depicted, where the identifiable objects 340, 350 and 360 are detected by the processing unit CPU to have changed their position to 344, 354 and 364. Translation along the axis around which the lens of the image capturing unit ICU1 is centered is detected by the processing unit CPU by comparing two or more image data sets taken at different time instants when all identifiable objects 340, 350 and 360 dissociate or consolidate from the image center as depicted in FIG. 4D. Here, the arrows, such as the arrow 416 depict the direction of movement of the identifiable objects 340, 350 and 360 away from the image center.

Figure 4E:
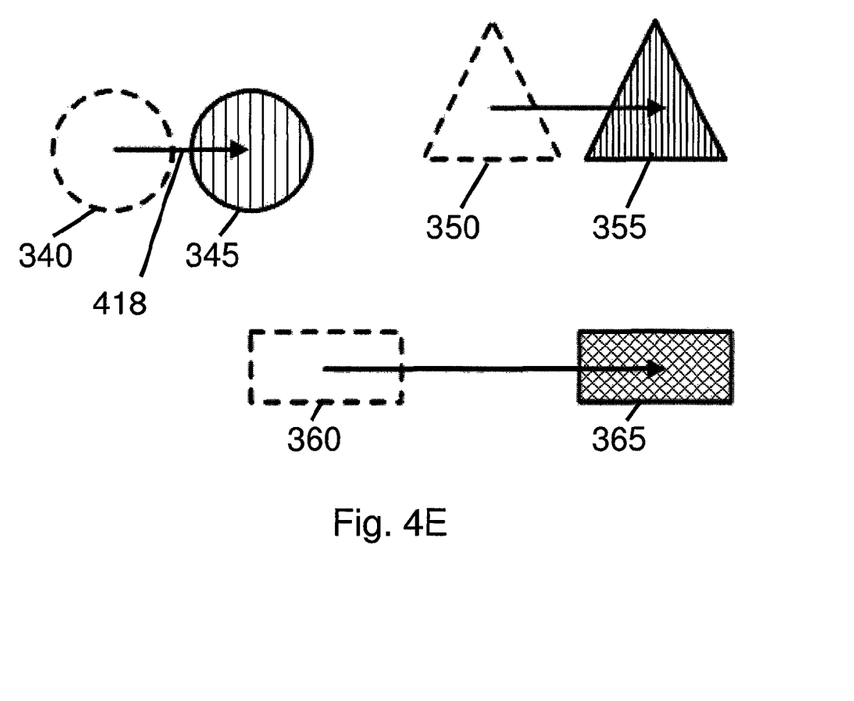

In FIG. 4E a second translational movement scenario is depicted, where the identifiable objects 340, 350 and 360 are detected by the processing unit CPU to have changed their position to 345, 355 and 365. Translation sideways, i.e. along a horizontal axis is detected by the processing unit CPU by comparing two or more image data sets taken at different time instants when all identifiable objects 340, 350 and 360 move sideways. However, the difference compared to rotation around a vertical axis as depicted in FIG. 4B is that during translation the identifiable objects 340, 350 and 360 will have different displacement, depending on their distance from the image capturing unit IGU1.

Figure 4F:
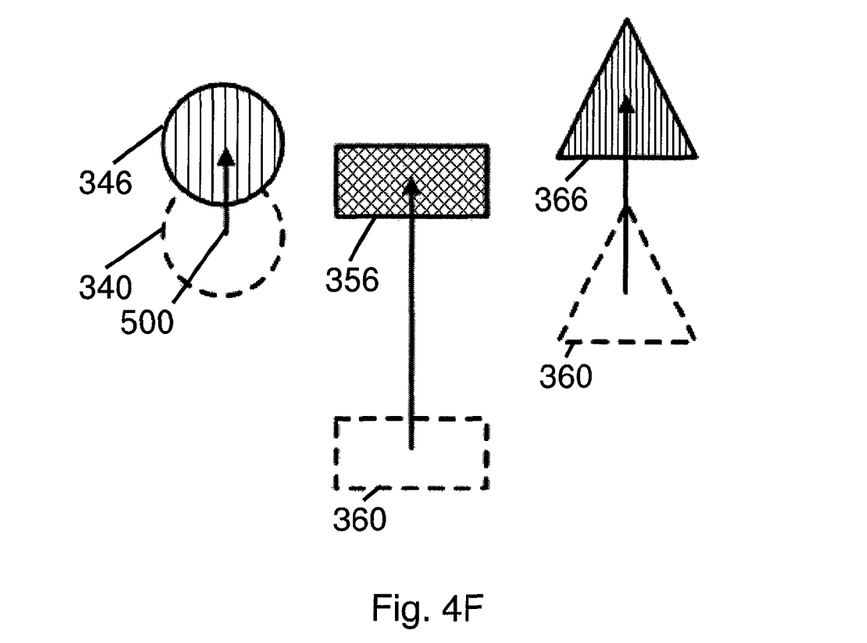

Finally, in FIG. 4F, a third translational movement scenario is depicted, where the identifiable objects 340, 350 and 360 are detected by the processing unit CPU to have changed their position to 345, 355 and 365. Vertical translation, i.e. translation along a vertical axis is detected by the processing unit CPU by comparing two or more image data sets taken at different time instants when all identifiable objects 340, 350 and 360 vertically. This case is very similar to the case of sideways translation depicted in FIG. 4E.

One other embodiment contemplated is to have the image capturing unit capture images of the environment around the portable terminal accessory in order to recalibrate magnetometers, gyroscopes, accelerometers, environmental sensors which are located in the portable terminal only. In order for this to work properly, the portable terminal would have to be equipped with an image capturing unit of its own. The user of the portable terminal accessory and the portable terminal would after the determination of the geographical coordinates of the portable terminal accessory and those of the object recognized in the image data supplied by the image capturing unit would be required to point a camera or other image capturing means of the portable terminal towards the image capturing unit of the portable terminal accessory to be able to register the new reference direction the image capturing means of the portable unit is facing.

The invention claimed is:

1. A method for calibration of a sensor unit or a sensor functionality in an electronic device comprising the steps:
   detecting a position of the electronic device, said position comprising geographical coordinates;
   capturing an image of the environment around the electronic device;
   detect presence of at least one identifiable object in the image captured, the at least one identifiable object being different from a user of the electronic device;
   determining a heading of a user of the electronic device by comparing a position of the object in relation to the position of the electronic device;
   using the heading of the user in order to calibrate one or more sensor devices or sensor functionalities in the electronic device,
      wherein the position of the electronic device is detected prior to comparing the position of the object in relation to the position of the electronic device.

2. The method for calibration according to claim 1, wherein the presence of the at least one identifiable object is detected by means of image analysis algorithms.

3. The method for calibration according to claim 2, wherein the at least one identifiable object is identified by comparing the image data captured with predefined objects from a database.

4. The method for calibration according to claim 3, wherein the at least one identifiable object is identified by comparing image data captured at least two different time instants.

5. The method for calibration according to claim 4, wherein the identification comprises identification of movement of the at least one identifiable object.

6. The method for calibration according to claim 1, wherein the one or more sensor devices comprise at least one of gyroscope, accelerometer or magnetometer.

7. The method for calibration according to claim 1, wherein the one or more sensor functionalities are at least one of a compass or inertial navigation system functionality in the mobile terminal.

8. A calibration device for calibration of a sensor device or a sensor functionality in an electronic device, comprising:
   a position detection device for determining a location of the electronic device, said position comprising geographical coordinates;

an image capturing device for capturing an image of an environment around the electronic device;

processing circuitry configured to analyze the captured image so as to detect presence of at least one identifiable object in the image, the at least one identifiable object being different from a user of the electronic device; and wherein the processing circuitry is configured to determine a heading of a user of the electronic device by comparison of a position of the at least one identifiable object in relation to a position of the electronic device and to use the heading in order to calibrate one or more sensor devices or sensor functionalities in the electronic device, wherein the processing circuitry is configured to obtain from the position detection device the location of the electronic device prior to comparing the position of the at least one identifiable object in relation to the position of the electronic device.

9. The calibration device according to claim 8, wherein the image capturing device comprises a digital camera unit.

10. The calibration device according to claim 9, wherein the digital camera unit forms part of a portable terminal accessory.

11. The calibration device according to claim 8, wherein the image capturing device is adapted to capture images in its field of view.

12. The calibration device according to claim 8, wherein the at least one identifiable object is located in a database of known objects accessible by the electronic device.

13. The calibration device according to claim 8, wherein the sensor comprises one of an accelerometer, magnetometer or gyroscope.

* * * * *

UNITED STATES PATENT AND TRADEMARK OFFICE
CERTIFICATE OF CORRECTION

PATENT NO. : 10,210,371 B2  
APPLICATION NO. : 13/663552  
DATED : February 19, 2019  
INVENTOR(S) : Magnus Abrahamsson et al.

Page 1 of 1

It is certified that error appears in the above-identified patent and that said Letters Patent is hereby corrected as shown below:

On the Title Page

Item (73), Assignee reads:  
"SONY MOBOLE COMMUNICATIONS INC."  
Should read:  
"Sony Mobile Communications Inc."

Signed and Sealed this  
Thirtieth Day of April, 2019

Andrei Iancu  
*Director of the United States Patent and Trademark Office*